(12) United States Patent
George et al.

(10) Patent No.: US 7,290,155 B2
(45) Date of Patent: Oct. 30, 2007

(54) METHOD, SYSTEM, AND APPARATUS FOR DYNAMICALLY CONFIGURING THE OPERATING POINT UTILIZED FOR THERMAL MANAGEMENT OF AN INTEGRATED CIRCUIT

(75) Inventors: Varghese George, Folsom, CA (US); Stephen H. Gunther, Beaverton, OR (US); Sanjeev Jahagirdar, Folsom, CA (US); Inder Sodhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 10/696,469

(22) Filed: Oct. 28, 2003

(65) Prior Publication Data

US 2005/0091548 A1    Apr. 28, 2005

(51) Int. Cl.
*G06F 1/00*    (2006.01)
(52) U.S. Cl. ............... 713/322; 713/300; 713/320; 327/100; 327/113

(58) Field of Classification Search ............. None
See application file for complete search history.

(56) References Cited

U.S. PATENT DOCUMENTS

| | | | | |
|---|---|---|---|---|
| 5,812,860 | A | * | 9/1998 | Horden et al. ............... 713/322 |
| 5,940,785 | A | * | 8/1999 | Georgiou et al. ............ 702/132 |
| 6,141,762 | A | * | 10/2000 | Nicol et al. .................. 713/300 |
| 6,288,395 | B1 | * | 9/2001 | Kuhnly et al. ......... 250/339.04 |
| 6,385,735 | B1 | * | 5/2002 | Wilson et al. .............. 713/501 |
| 6,772,356 | B1 | * | 8/2004 | Qureshi et al. ............. 713/321 |
| 6,898,740 | B2 | | 5/2005 | Olarig ......................... 714/43 |

OTHER PUBLICATIONS

U.S. Patent and Trademark Office, Office Action Mailed Jan. 29, 2007 in related U.S. Appl. No. 11/521,649, pp. 1-8.

* cited by examiner

*Primary Examiner*—James K. Trujillo
*Assistant Examiner*—Anand B. Patel
(74) *Attorney, Agent, or Firm*—Trop, Pruner & Hu, P.C.

(57) ABSTRACT

Methods and circuits to define a thermal operating mode for a integrated device by defining an operating voltage and a frequency range.

15 Claims, 4 Drawing Sheets

METHOD, SYSTEM, AND APPARATUS FOR DYNAMICALLY CONFIGURING THE OPERATING POINT UTILIZED FOR THERMAL MANAGEMENT OF AN INTEGRATED CIRCUIT

BACKGROUND

1. Field

The present disclosure pertains to the field of thermal and power management. More particularly, the present disclosure pertains to dynamically configuring the operating point as utilized for thermal management of an integrated circuit (IC).

2. Description of Related Art

Power management schemes allow for dynamically adjusting the power consumption of an electronic component in order to meet the power consumption requirements for various types of systems and integrated devices, such as, servers, laptops, integrated devices and desktops. Typically, thermal management schemes provide a means for adjusting power consumption in order to limit the integrated device's operating temperature. The maximum allowable operating temperature for an integrated circuit is a function of the specific characteristics of a given unit. For example, units that have a higher operating frequency may be allowed to operate at higher temperatures than other units of the same design that have lower operating frequencies. The allowable operating temperature of a device may also be a function of the voltage supplied to the device or some other characteristic that varies across the distribution of parts built from a single design. Because these characteristics may change over the multi-year lifetime during which a specific design is manufactured, the allowable operating temperatures may also change over this manufacturing lifetime. Likewise, different units of the same design will have different power consumption. As a result, the power reduction necessary to meet a thermal management requirement may change from unit to unit across the manufacturing lifetime of the design. Hence, taking an identical action in response to a thermal event on all parts manufactured from a particular design may be non-optimal.

One means of configuring the operating point for a thermal management event would be to allow software programmability. With this approach, software must know the relevant operating characteristics of that specific part, However, such a scheme may be susceptible to software tampering to allow improper and unsupported voltage, frequency, or thermal operating points.

BRIEF DESCRIPTION OF THE FIGURES

The present invention is illustrated by way of example and not limitation in the Figures of the accompanying drawings.

DETAILED DESCRIPTION

The following description provides a method and apparatus for improved configuration of the operating point to be used in the event of a thermal management issue. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, the present methods incorporate software to configure the operating point utilized for dealing with a thermal issue on an integrated circuit. In contrast, the claimed subject matter is not dependent on software to define the operating points within an operating range for a processor. The claimed subject matter facilitates dynamically configuring an operating point used in response to a predetermined condition. For example, one predetermined condition may be a thermal issue as indicated by a thermal sensor indicating the integrated device's temperature meets or exceeds a temperature threshold. Another example of a predetermined condition may be a power issue, wherein the integrated device or a system with at least one integrated device meets or exceeds a power consumption threshold. Consequently, the claimed subject matter responds to the predetermined condition by adjusting the frequency, such as, bus ratio, and adjusting the voltage. This mechanism chooses the operating point based on the characteristics of that specific unit. Furthermore, the bus ratio to be used in response to the predetermined condition will be discussed in further detail in the following figures.

Figure 1:
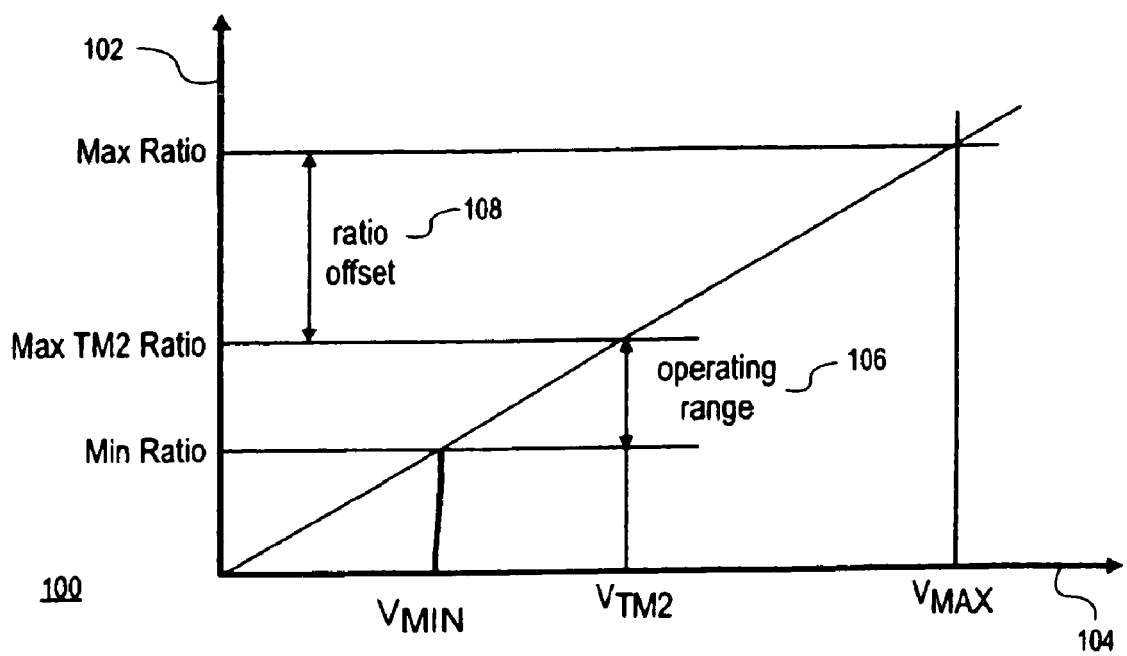
FIG. 1 illustrates a chart for a method utilized in accordance with an embodiment

FIG. 1 illustrates a chart for a method utilized in accordance with an embodiment. In one aspect, the claimed subject matter adjusts the operating point used for responding to a thermal issue based on the normal operating frequency and voltage of that specific processor. Likewise, the operating point adjustment is made upon detection of the predetermined condition, such as, for example, a thermal issue or power issue.

The claimed subject matter facilitates a thermal monitor mechanism to allow one skilled in the art, such as, a system designer to reduce the cost of thermal solutions without compromising system integrity or reliability. For example, in one embodiment, frequency and voltage scaling are used for reducing power to maintain the integrated device's temperature within a predetermined operating range. In one embodiment, a thermal sensor, coupled to the integrated device, indicates whether the integrated device's temperature meets or exceeds a predetermined threshold. If so, the thermal monitor is enabled to reduce the frequency and voltage. In the event the integrated device's temperature is less than the threshold, the thermal monitor is disabled and the integrated device operates at the original frequency and voltage before the thermal monitor was enabled. For example, in one embodiment, the integrated device, such as, a processor, is operating at a normal operating point with a voltage of $V_{nominal}$. In the event of a thermal issue, such as, when the thermal sensor indicates the temperature of the integrated device meets or exceeds a predetermined threshold, the thermal monitor is enabled and the processor's logic facilitates a change in voltage and frequency in response to the thermal issue to reduce power consumption. Consequently, the frequency is changed to a value within an desired operating range, which is discussed further in connection with FIGS. 1-4 below, and the voltage is reduced to the minimum level that still supports operation at the new frequency.

The chart depicts a two dimensional graph, an x-axis 104 and a y-axis 102 that depict an operating voltage of the processor and a bus ratio of the processor, respectively. In one embodiment, the bus ratio is defined as the processor's core frequency divided by a bus frequency. In the same embodiment, the chart depicts defining an operating range 106 when the thermal monitor mechanism is enabled, such as, in one embodiment, in the event of a thermal issue when the thermal sensor indicates the temperature of the integrated device meets or exceeds a predetermined threshold. Therefore, the chart depicts an operating range 106 at a predetermined first voltage, $V_{TM2}$, for the processor when the thermal monitor is enabled; otherwise, the processor is allowed to operate in a range defined as between $V_{MIN}$ and Vmax for the voltage and Min Ratio to a Maximum Bus Ratio (Max Ratio). In the same embodiment, the Maximum Bus Ratio and the predetermined first voltage are determined during manufacturing test. Likewise, the predetermined first voltage for the operating range 106 is stored in a plurality of fuses. A ratio offset 108 will be described in further detail in connection with FIG. 2.

In one embodiment, the predetermined first voltage is determined during silicon testing. Likewise, in one embodiment, the predetermined first voltage is the lowest voltage that is sufficient for the processor to perform at the frequency (bus ratio) chosen in response to the predetermined condition. Furthermore, the the predetermined first voltage is programmed into an integrated device, for example, by storing it into a plurality of fuses.

In one embodiment, the Max Ratio is the highest ratio that an integrated device, such as, a processor may perform without errors. Likewise, it is programmed into fuses. In one embodiment, the fuses are programmed with the Max Ratio at production testing. In contrast, in one embodiment, the startup bus ratio is not necessarily the same as the Max Ratio. For example, an integrated device for a mobile product may utilize the Min Ratio for a boot up operation. In contrast, an integrated device for a desktop product, the startup ratio is the same as the Max Ratio.

Therefore, the claimed subject matter facilitates a thermal monitor mechanism to minimize performance impact as the operating voltage and frequency are lowered to accommodate the thermal event. As described earlier, the claimed subject matter determines the predetermined first voltage, which is the lowest voltage that is required for the processor to operate at the frequency utilized in response to a thermal issue. Subsequently, the operating range is defined and one may select a frequency between Min Ratio and Max TM2 ratio based at least in part on the amount of power reduction that is needed. For example, if the thermal monitor is enabled, one may select an operating frequency that has the smallest amount of power reduction in response to the predetermined condition while having the best performance. In contrast, one may select an operating frequency of Mm ratio that has the most amount of power reduction in response to the predetermined condition while having the worst performance.

Figure 2:
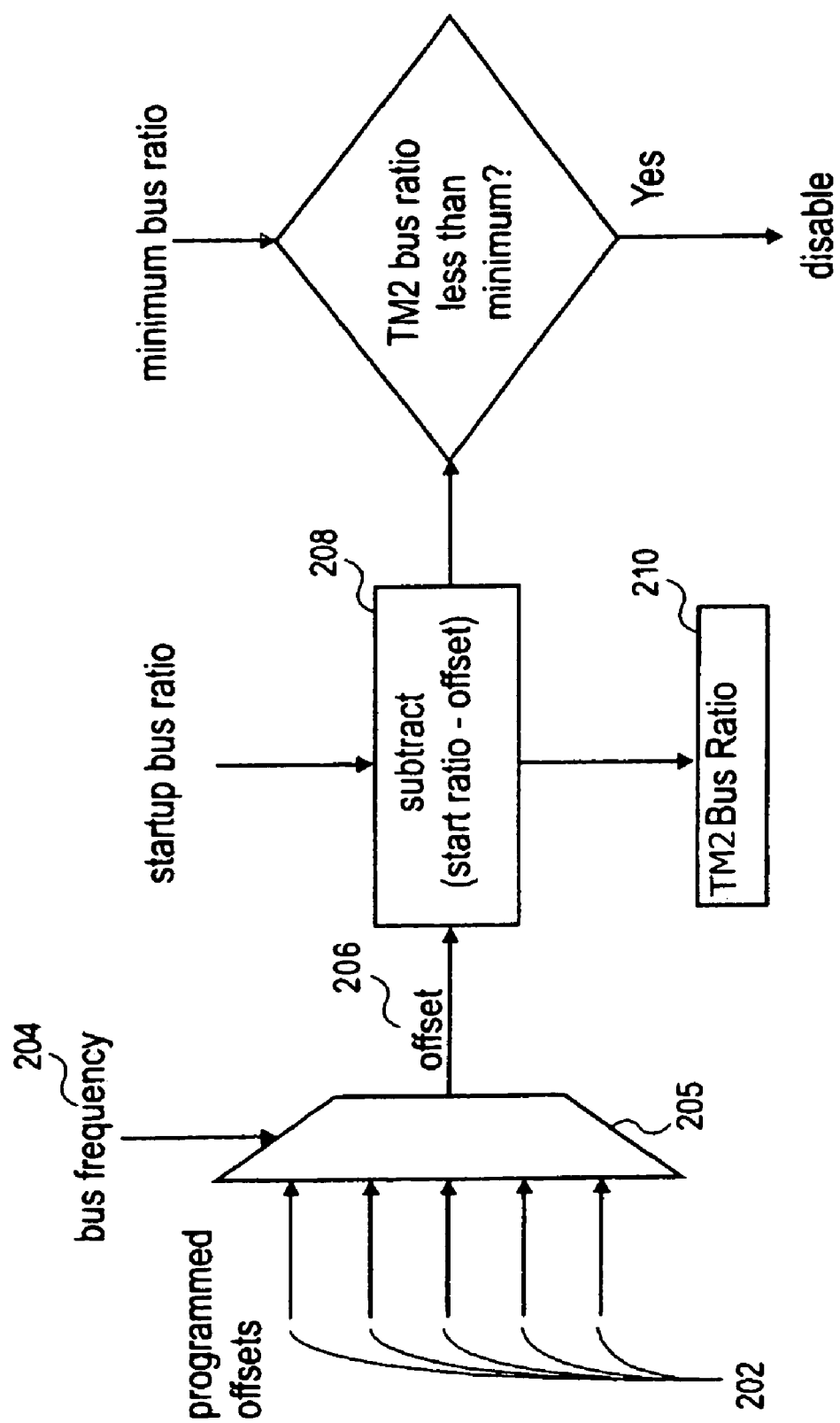
FIG. 2 illustrates a schematic utilized in accordance with an embodiment.

FIG. 2 illustrates a schematic utilized in accordance with an embodiment. In one embodiment, the schematic incorporates the logic for defining the operating range 106 used during response to the predetermined condition as depicted in connection with FIG. 1. For example, a processor may support a plurality of different bus frequencies. A bus ratio for the operating range 106 is determined by subtracting an offset from a startup bus ratio, wherein the offset depends on the processor's bus frequency 204. For example, in one embodiment, the offset values are calculated for each of the supported bus frequencies and are determined based at least in part on power estimates and are coded into RTL as constants.

Consequently, the offsets for all the supported bus frequencies are programmed into the CPU. In the event of a processor reset or startup, the multiplexer 205 selects one of the programmed offsets 202 based on the bus frequency 204. Subsequently, the offset 206 is subtracted from the startup bus ratio 208 to determine an operating range bus ratio, 210, to be utilized by the processor when the thermal monitor is active (referred to as TM2). However if this operating range bus ratio (TM2) is less than the minimum supported bus ratio, the thermal monitor mode is disabled.

Figure 3:
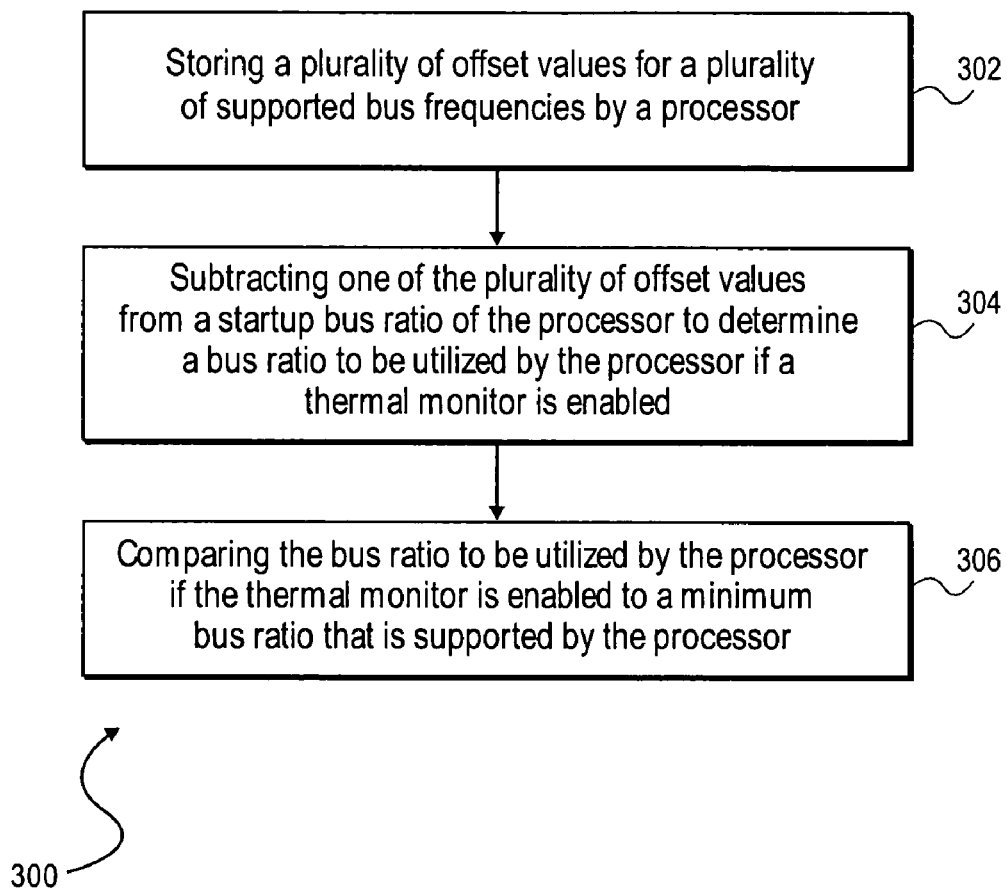
FIG. 3 illustrates a flowchart for a method utilized in accordance with an embodiment.

FIG. 3 illustrates a flowchart for a method utilized in accordance with an embodiment. In one embodiment, the flowchart 300 depicts defining a bus ratio to be utilized by a processor upon activation of a thermal monitor. The flowchart depicts storing a plurality of offset values for a plurality of supported bus frequencies by the processor, as depicted in a block 302. Subsequently, one of the plurality of offset values is selected and is subtracted from a startup bus ratio of the processor to determine a bus ratio to be utilized by the processor when the thermal monitor is active, as depicted in a block 304. In one embodiment, one of the plurality of offset values is selected based at least in part on a bus frequency of the processor. Consequently, comparing the bus ratio to be utilized by the processor if the thermal monitor is active to a minimum bus ratio that is supported by the processor, as depicted by a block 306. If the bus ratio is less than the minimum bus ratio, then the thermal monitor is disabled and the processor operates at the voltage and frequency that were being utilized before entering the thermal monitor.

Figure 4:
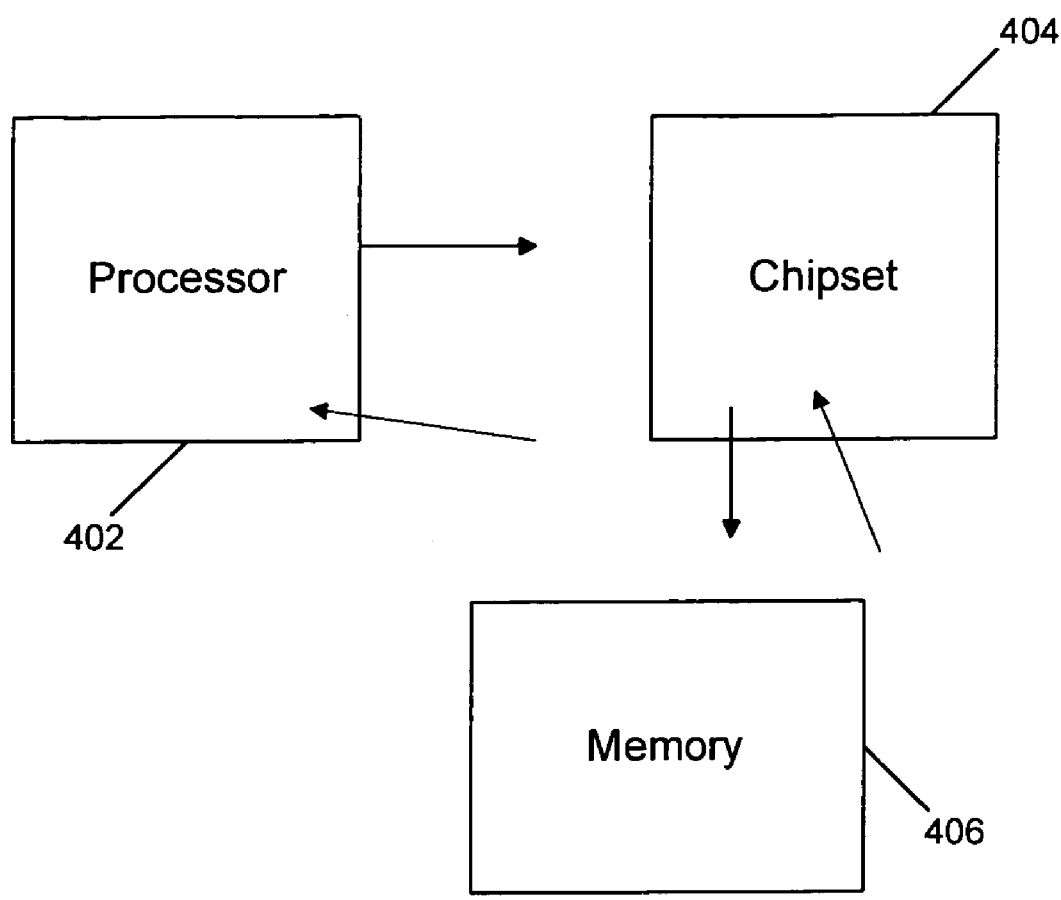
FIG. 4 illustrates a system in accordance with one embodiment.

FIG. 4 depicts a system in accordance with one embodiment. The system in one embodiment is a processor 402 that is coupled to a chipset 404 that is coupled to a memory 406. For example, the chipset performs and facilitates various operations, such as, memory transactions between the processor and memory. In one embodiment, the system comprises one or all of the previous embodiments depicted in connection with FIGS. 1-3 of the specification to support a processor's thermal operating range upon enabling a thermal mode.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
    enabling a reduced power operating mode in response to a thermal condition for an integrated device;
    changing the integrated device's voltage from a first voltage to a second voltage upon activation of the reduced power operating mode;
    operating the integrated device at a frequency within an operating range based at least in part on a desired amount of power reduction, wherein a bus ratio utilized in the reduced power operating mode is less than a maximum bus ratio for the integrated device and is calculated based on subtraction of an offset from the maximum bus ratio, the offset is based at least in part on a supported bus frequency of the integrated device.

2. The method of claim 1 wherein the first voltage is a nominal operating voltage and the second voltage is a reduced voltage that is defined during manufacture of the integrated device.

3. The method of claim 2 wherein the second voltage is stored into a plurality of fuses.

4. The method of claim 1 wherein the integrated device is a processor.

5. An apparatus comprising:
a thermal monitor to be enabled if a temperature of an integrated circuit meets or exceeds a threshold value;
a multiplexer to receive a plurality of offset values and a bus frequency that is supported by the integrated circuit and to forward one of the offset values based at least in part on the bus frequency; and
a logic unit to determine a thermal event bus ratio based on a difference between an initial bus ratio and the selected offset value, determine if the thermal event bus ratio is at least equal to a minimum bus ratio, and to change a voltage and frequency of the integrated circuit if the temperature meets or exceeds the threshold value.

6. The apparatus of claim 5, wherein the thermal monitor is to be disabled if the thermal event bus ratio is below the minimum bus ratio.

7. The apparatus of claim 6, wherein the integrated circuit comprises a processor.

8. The apparatus of claim 5, wherein the changed voltage corresponds to a lowest voltage capable of operation of the integrated circuit in response to a thermal issue.

9. The apparatus of claim 8, wherein a value of the changed voltage is stored in a fuse of the integrated circuit.

10. The apparatus of claim 8, wherein the changed frequency in response to the thermal issue is within an operating range between the minimum bus ratio and a maximum thermal event bus ratio available at the lowest voltage.

11. A system comprising:
a processor including a thermal monitor to be enabled if a temperature of the processor is at least at a threshold value, a multiplexer to receive a plurality of offset values and a bus frequency that is supported by the processor and to forward one of the offset values based at least in part on the bus frequency, and a logic unit to determine a thermal event bus ratio based on a difference between an initial bus ratio and the selected offset value, determine if the thermal event bus ratio is at least equal to a minimum bus ratio, and to change a voltage and frequency of the processor if the temperature is at least at the threshold value; and
a memory coupled to the processor via a chipset.

12. The system of claim 11, wherein the thermal monitor is to be disabled if the thermal event bus ratio is below the minimum bus ratio.

13. The system of claim 12, wherein the changed voltage corresponds to a lowest voltage capable of operation of the processor in response to a thermal issue.

14. The system of claim 13, wherein a value of the changed voltage is stored in a fuse of the processor.

15. The system of claim 14, wherein the changed frequency in response to the thermal issue is within an operating range between the minimum bus ratio and a maximum thermal event bus ratio available at the lowest voltage.

* * * * *